Aug. 26, 1930.     R. C. PELTON     1,773,853
CULTIVATOR FENDER
Filed Sept. 21, 1928

Inventor
R. C. Pelton

By Lacey & Lacey, Attorneys

Patented Aug. 26, 1930

1,773,853

UNITED STATES PATENT OFFICE

ROBERT C. PELTON, OF BLOOMDALE, OHIO; M. K. FOX ADMINISTRATOR OF SAID ROBERT C. PELTON, DECEASED

CULTIVATOR FENDER

Application filed September 21, 1928. Serial No. 307,480.

The present invention is directed to improvements in cultivator fenders.

The primary object of the invention is to provide a device of this character so constructed that it can be attached to a cultivator for shielding the growing plants against injury by lumps of earth turned by the shovels.

Another object of the invention is to provide a device of this character so constructed that it will be firmly braced against inward movement under pressure of the earth being turned by the shovels.

Another object of the invention is to provide a device of this character so constructed that the earth will be acted upon in such manner that injury to the plants by the earth coming in contact therewith will be positively eliminated.

With these and other objects in view, this invention resides in the novel features of construction, formation, combination and arrangement of parts to be hereinafter more fully described, claimed, and illustrated in the accompanying drawings, in which:—

Figure 1:
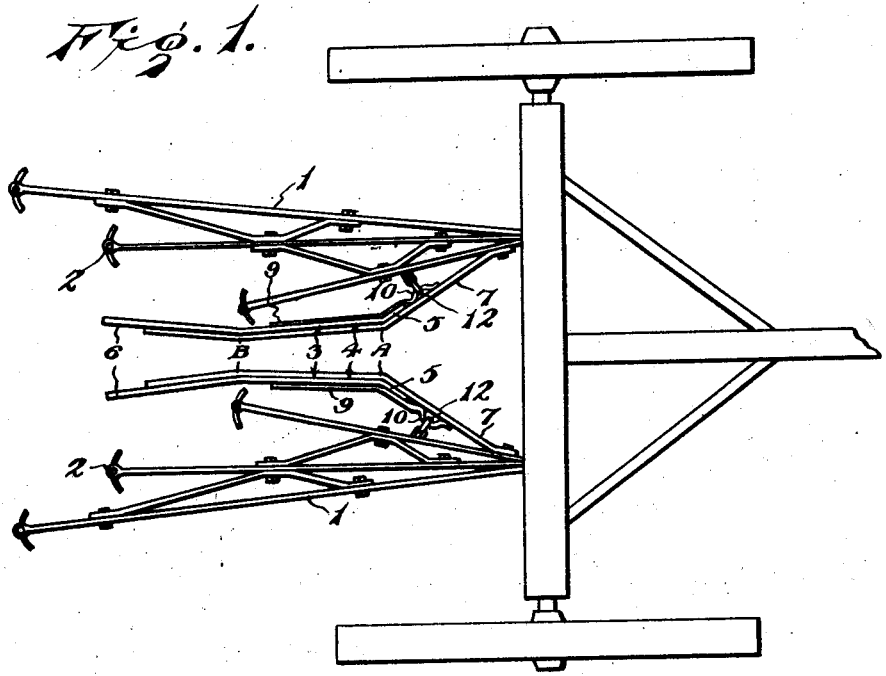
Figure 1 is a plan view of a cultivator showing the same equipped with a pair of the fenders.
Figure 2:
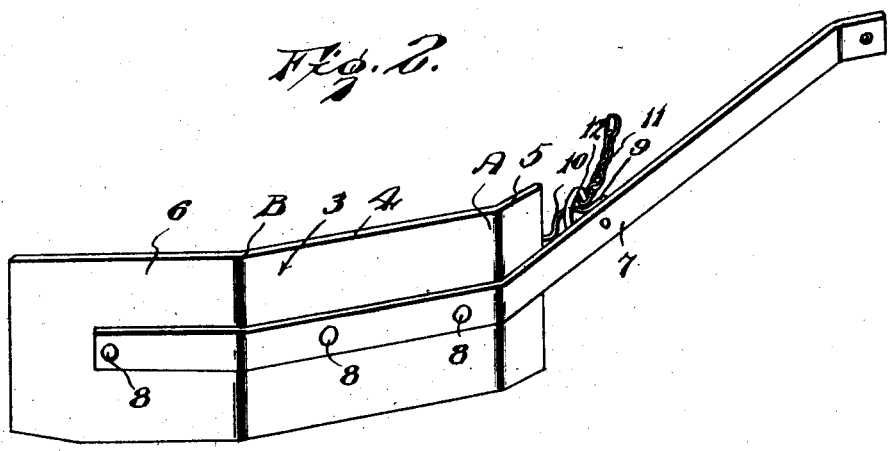
Figure 2 is a perspective view of one of the fenders removed.

Referring to the drawings, the numeral 1 designates the beam gangs of a conventional form of one row cultivator and to which are secured in the customary manner the shovels 2.

The fender comprises a sheet metal plate 3 of suitable gauge to prevent bending or warping thereof when encountering field obstructions of abnormal size.

The plate forming the fender comprises an intermediate section 4 and outwardly flared front and rear flanges 5 and 6, respectively, the flange 6 being somewhat larger in area than the flange 5.

The flanges 5 and 6 are provided by bending the plate 3 on the lines A and B. In order that the fender can be secured to the beam 1 of the cultivator a strap iron bar 7 is provided and has its forward end secured to the beam in any approved manner, said bar being secured longitudinally of the plate by rivets 8 or in any other manner desired.

The bar 7 is bent in order that it will fit snugly against the plate.

Having its forward end secured to the bar 7 is a bar 9, said bar being provided with a loop 10 formed near its forward end, the remaining portion of said bar being secured to the section 4 by the rivets 8. A section of the chain 11 is provided and has a ring 12 carried by its inner end for engaging the loop 10, the other end of the chain being suitably secured to an adjacent beam gang. This chain will obviously prevent bending of the bar 7, and will consequently prevent the plate 3 from swinging inwardly when the same is subjected to the pressure of the earth turned by the shovels.

Since the forward flange is bent or flared outwardly, leaning plants will not be caught thereon and the loose earth or lumps turned by the adjacent shovel will be prevented from passing around the front of the flange to injure the plants. The section 3 of the plate and the flange 6 will obviously deflect the dirt and lumps away from the plants as the cultivator moves across the field.

The lower edges of the fenders will be set slightly above the surface of the earth to permit fine soil to pass thereunder, and will not leave a ridge and form a groove or gutter as now done with the conventional form of straight edge fenders. It will thus be seen that when the fender is moved over and slightly above the earth a smooth surface of fine soil is produced upon the sides of the row of plants and when two fenders are used for one row cultivator, as shown in Figure 1, smooth surfaces will be provided upon opposite sides of the row.

From the foregoing, it is thought that the construction, operation, and many advantages of the herein described invention will be apparent to those skilled in the art, without further description, and it will be understood that various changes in the size, shape, and proportion and minor details of construction, may be resorted to without departing from the spirit or sacrificing any of the advantages of the invention.

Having thus described the invention, what is claimed is:

1. The combination with the beam of a cultivator, of a fender including a plate, a bar secured to the plate, means for securing the bar to the cultivator beam, a second bar having its rear end secured to the plate and its rear end secured to said bar, the second bar having a loop thereon, and flexible means connecting the loop with the cultivator.

2. The combination with the beam of a cultivator, of a fender comprising a plate, a bar secured to the plate, means for attaching the bar to the beam, a second bar fixed to the plate and said bar, said second bar having a loop formed intermediate its ends, a ring engaged in the loop, and a chain having one of its ends secured to the ring and its other end connected with the cultivator.

3. The combination with a cultivator, of a pair of fenders, each consisting of a straight vertical section, said sections being divergingly arranged, said straight sections having flanges upon their ends, said flanges being disposed in diverging relation.

In testimony whereof I affix my signature.

ROBERT C. PELTON. [L. S.]